(12) United States Patent
Salice (10) Patent No.: US 6,418,589 B1
(45) Date of Patent: Jul. 16, 2002

(54) APPARATUS TO FASTEN A FITTING, PREFERABLY THE SUPPORT ARM OF A HINGE, TO A PANEL OF A PIECE OF FURNITURE OR THE LIKE

(75) Inventor: Luciano Salice, Carimate (IT)

(73) Assignee: Arturo Salice S.p.A., Novedrate/Como (IT)

( * ) Notice: Subject to any disclaimer, the term of this patent is extended or adjusted under 35 U.S.C. 154(b) by 0 days.

(21) Appl. No.: 09/502,932

(22) Filed: Feb. 11, 2000

(30) Foreign Application Priority Data

Feb. 11, 1999 (DE) .................................... 299 02 443 U
Apr. 1, 1999 (DE) .................................... 299 06 051 U
May 4, 1999 (DE) .................................... 299 07 930 U (51) Int. Cl.[7] .............................................. E05D 7/10
(52) U.S. Cl. .............................. 16/258; 16/382; 16/254
(58) Field of Search ...................... 16/382, 258, 254, 16/242, 271; 403/322.4, 314, 320, 374.2, 374.1

(56) References Cited

U.S. PATENT DOCUMENTS

| | | | |
|---|---|---|---|
| 4,691,408 A | * 9/1987 | Rock et al. | 16/382 X |
| 4,847,948 A | * 7/1989 | Gross et al. | 16/254 X |
| 5,022,116 A | * 6/1991 | Salice | 16/258 |
| 5,025,530 A | * 6/1991 | Ferrari et al. | 16/258 X |
| 5,054,164 A | * 10/1991 | Blanco-Equiluz | 16/258 |
| 5,056,189 A | * 10/1991 | Brustle et al. | 16/258 X |
| 5,056,192 A | 10/1991 | Grass | |
| 5,159,740 A | * 11/1992 | Brustle et al. | 16/258 |
| 5,239,730 A | 8/1993 | Grass | |
| 5,253,390 A | 10/1993 | Gross et al. | |
| 5,276,944 A | * 1/1994 | Lin | 16/258 |
| 6,061,872 A | * 5/2000 | Albrecht et al. | 16/258 |
| 6,148,479 A | * 11/2000 | Lin | 16/258 |

FOREIGN PATENT DOCUMENTS

| | | | |
|---|---|---|---|
| DE | 3500423 A1 | * 7/1986 | 16/254 X |
| DE | 3516911 A1 | * 11/1986 | 16/254 X |
| DE | 3939080 A1 | * 5/1990 | 16/254 X |
| DE | 4016664 | 11/1991 | |
| DE | G9409459 | 8/1994 | |
| DE | 29511216 | 9/1995 | |
| DE | 9409743 | 10/1995 | |
| EP | 0369261 | 5/1990 | |
| GB | 2257747 A | * 1/1993 | 16/382 |
| HU | 208447 B | 7/1992 | |

OTHER PUBLICATIONS

Hungarian Search Report categorizing all references as A. P 0000561, Oct. 2000.
English Language Abstract for EP Patent EP0369261.

* cited by examiner

*Primary Examiner*—Lynne H. Browne
*Assistant Examiner*—David E. Bochna
(74) *Attorney, Agent, or Firm*—Dilworth & Barrese LLP (57) ABSTRACT

An apparatus for fastening of a fitting is provided, preferably the support arm of a hinge, to a panel of a piece of furniture or the like and form of a base plate fastenable to the panel, for example, by dowel or screws. The fitting or a part connected thereto can be fastened to the base plate. More particularly, the base plate and the fitting are provided, on one end thereof, with protrusions and/or bends that can be hooked together and on opposite end regions, with a device for interlocking the base plate and fitting together.

14 Claims, 9 Drawing Sheets

APPARATUS TO FASTEN A FITTING, PREFERABLY THE SUPPORT ARM OF A HINGE, TO A PANEL OF A PIECE OF FURNITURE OR THE LIKE

BACKGROUND OF THE INVENTION

The present invention relates to an apparatus for the fastening of a fitting, preferably the support arm of a hinge, to a panel of a piece of furniture or the like consisting of a base plate fastenable to the panel, for example by dowels or screws, to which base plate the fitting or a part connected thereto can be connected.

For example, when furniture doors are affixed to the side panels of cupboards, the assembly work is made considerably easier if the hinge arms of the hinges already pre-mounted on the furniture doors do not have to be screwed to the side panels or base plates already fastened thereto, but can simply be locked onto base plates pre-mounted on the side panels by means of snap catches. Such locking connections between pre-mounted base plates and hinge arms provided with locking devices, which hinges arms are normally disposed on an intermediate plate supporting the hinge arm, are known in various embodiments. These locking devices, which are easy and fast to mount, however, normally require complex locking devices which therefore make the hinges or their base and intermediate plates more expensive.

SUMMARY OF THE INVENTION

It is therefore the object of the invention to provide a fastening apparatus of the type first described which allows a simple and fast connection of the fitting to a base plate and which can also be detached again simply and fast.

This object is solved in accordance with the invention by the base plate and the fitting being provided on one end with protrusions and/or bends which can be hooked up to one another and on their opposite end regions with a device which interlocks the two.

In accordance with a preferred embodiment, it is provided that the base plate and the fitting or the part connected thereto can be brought into their coupled position where they grip behind each other by parallel shifting and that the base plate is provided on its opposite end region with a rotatable, but axially unmovable, eccentric, disc-shaped head which is rotatable out of its position covering the base plate into a position protruding over this, in which it penetrates the fitting in a breakthrough, grips over a shoulder of the edge of the breakthrough and moves the fitting in such a way that the parts to be hooked together come into their coupled position.

The fastening apparatus in accordance with the invention allows a simple and fast and detachable connection of a fitting to a pre-mounted base plate. The fitting or a part connected thereto only needs to be set onto the base plate, with it subsequently only being necessary to make the connection to turn the eccentric head using a tool, for example a screwdriver, by a fraction of a whole turn in order to effect a solid connection. By a corresponding turning back of the eccentric disc, the connection can be detached again. The fastening apparatus in accordance with the invention can also be mounted easily for the reason that the base plate can be fastened in a simple manner in pre-bored holes of a support part by screws or insertable dowels.

Appropriately, the coupling part of the fitting is a plate.

The base plate can be provided on its front end with an acute-angled edge and the plate with a complementary bend gripping behind such edge so that the hooking together of the two parts can be effected simply.

In another aspect of the invention, it is provided that the shoulder of the edge of the breakthrough of the plate, which shoulder is gripped over by the head, is provided with a wedge-shaped chamfer so that when the eccentric head is turned, the fitting is tightened against the base plate.

In accordance with another embodiment, the object is solved by the base plate and the fitting being provided on ends opposite each other with parts which can be hooked together by parallel moving and a gripping behind one another and the base plate being rotatably, but axially unmovably provided with an eccentric, plate-shaped head which penetrates a breakthrough in the fitting, engages at an edge of the breakthrough and thus moves the parts to be hooked together into their coupled position.

To simplify the mounting of the apparatus in accordance with the invention, which is particularly appropriate when, for example, multiple hinges supporting a door have to be mounted on a panel of a piece of furniture, in accordance with an inventive further development it is provided that the fitting hooked to the base plate or the intermediate plate connected thereto and hooked together with the base plate can be fixed loosely together at their end regions opposite the hook connecting for purposes of pre-mounting by a resilient snap connection. This aspect of the invention allows the fittings or the hinge arms to be loosely connected to the panel of the piece of furniture or the like by a simple hooking up and pressing down so that the required adjustments can be made before the fitting or the intermediate plate is interlocked with the base plate.

Appropriately, the fitting is provided at its end region with a resilient element which snaps behind a locking edge of the base plate chamfered at the rear when it is pressed into the plane of the base plate.

Appropriately, the resilient elements consists of a spring wire retained on the side edges of the intermediate plate.

In accordance with another embodiment, it is provided that the resilient element consists of a spring lock washer retained on the shaft of the eccentric cam between the eccentric head and the base plate.

Another aspect of the present invention relates to the fastening of a hinge cup insertable into a recess to a ground plate to be fasted to a parts such as a door or the like to be jointed by the hinge. Such a ground plate can, for example, be mounted fast by a machine by means of screws and, if necessary, dowels. It is provided here in accordance with the invention that the ground plate is insertable into the recess and an interlocking device is provided to interlock the hinge cup to the ground plate.

The interlocking of the hinge cup on the ground plate disposed below it is therefore effected on the inside of the recess. A hinge-cup flange, for example, extending over the rim of the recess can remain free of interlocking means or holes and have a smooth finish.

In a further embodiment of the invention, the interlocking device is fastened to the ground plate and can be brought into interlocking engagement with the bottom of the hinge cup. Generally, a reverse disposition could also be provided, i.e. the interlocking device could be disposed on the hinge cup. The embodiment described above, however, has some advantages with regard to a space-saving configuration which is simultaneously easier to operate.

The interlocking device preferably consists of a closed, detachable fast interlock, in particular it can be designed as an interlocking eccentric cam. Here, the interlocking device is movable between an assembly position in which the hinge cup can be set into the recess and onto the ground plate and an interlocking position in which the hinge cup is interlocked on the ground plate. One particularly advantageous aspect consists of a rotatable eccentric head being fastened to the ground plate, which head grips over the bottom of the hinge cup in its interlocking position. The eccentric head is preferably disc-shaped and sits on an equally eccentric collar whose height roughly corresponds to the thickness of the hinge cup bottom.

To avoid any impeding of the hinge link in the closed state, the bottom of the hinge cup can possess a hollow which accepts the section of the interlocking eccentric cam gripping over the bottom. The eccentric head therefore does not project as an impediment over the bottom surface of the hinge cup, but is essentially lowered in the hollow of the hinge cup.

To allow the hinge cup to be pushed over the eccentric head, a recess is provided in the hollow in the hinge cup bottom, which recess is penetrated in the mounted state by the eccentric head. To avoid any impediment of the hinge link to the greatest possible extent, and to simplify the mounting of the hinge cup, the recess or the interlocking device can be disposed slightly radially offset from the centre of the hinge cup. Preferably, the radial offset is directed away from the side at which the hinge links are jointed to the hinge cup. In this way, in the opened state of the hinge, the interlocking device is easily accessible.

To ensure a simple mounting, advantageously a stop is provided to determine the mounting position of the interlocking device. The stop can interact with the preferably also eccentrically disposed collar of the eccentric head which limits the rotation of the eccentric cam and determines its mounting position. The stop can in particular be formed as a projecting embossing in the ground plate. In this way, no additional parts are required and a simple assembly is ensured.

In a further embodiment of the invention, the hinge cup is tightened against the ground plate by the interlocking device. Preferably, for his purpose a wedge-shaped chamfer surface is provided which, when the interlocking device is moved into its interlocking position, pulls the bottom of the hinge cup onto the ground plate. The tightening of the hinge cup on the ground plate effects a secure fastening of the part such as a door to be jointed without any play or wobble. The wedge-shaped chamfer surface is preferably provided on the interlocking device, in particular the eccentric head. Generally, the chamfer surface could also be provided in the opposite manner on the hinge cup or the ground plate. The previously described embodiment, however, possesses some advantages in the manufacture of the hinge cup or the ground plate.

Furthermore, one advantageous embodiment of the invention consists of the ground plate possessing an essentially U-shaped cross-section having fastening flanges protruding laterally from the recess to which flanges the ground plate can be mounted fast to the door, for example by screws. The fastening of the ground plate by means of laterally protruding flanges permits longer screws, as in this region the part to be jointed possesses a greater thickness. The hinge cup can also possess laterally shaped flanges which fully cover the ground plate. In this way, the flanges of the base plate with the fastening means disposed thereon are covered, a visually attractive surface is achieved. In particular, the flanges formed on the hinge cup possess a circumferential bridge with which they encompass the ground plate true to size.

BRIEF DESCRIPTION OF THE DRAWINGS

Embodiments of the invention are described in more detail below by means of the drawing in which.

DESCRIPTION OF THE PREFERRED EMBODIMENTS

Figure 1:
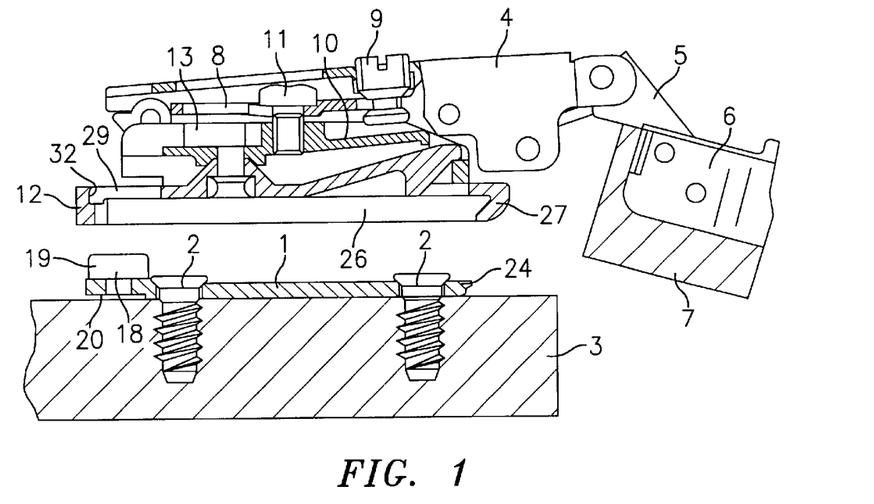
FIG. 1 shows a section through a three-dimensionally adjustable hinge arm whose lower intermediate plate can be connected to a base plate pre-mounted on a carrying panel, in a state raised from this.
Figure 2:
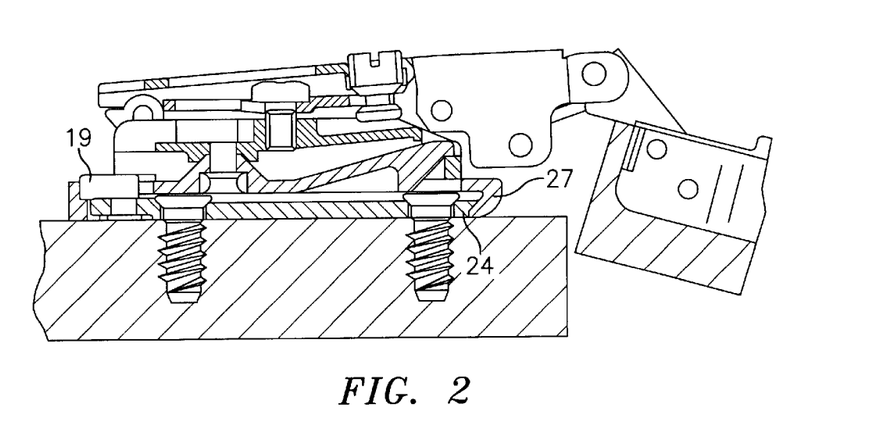
FIG. 2 shows the representation of FIG. 1 in which the intermediate plate supporting the hinge arm is connected to the pre-mounted base plate.
Figure 3:
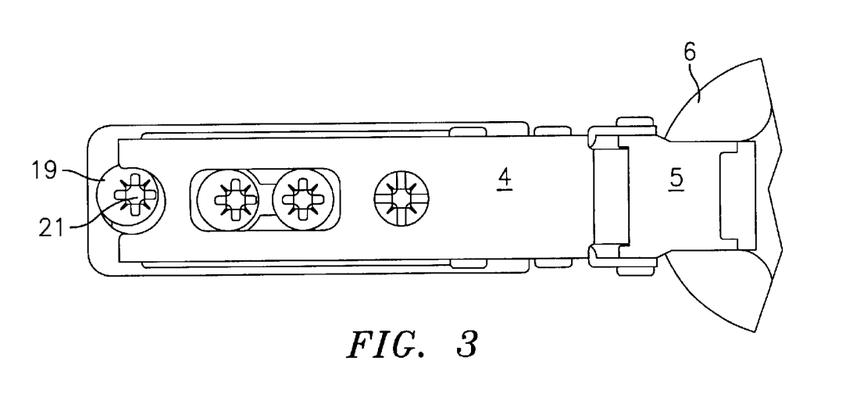
FIG. 3 shows a top view of the disposition of FIG. 2.
Figure 4:
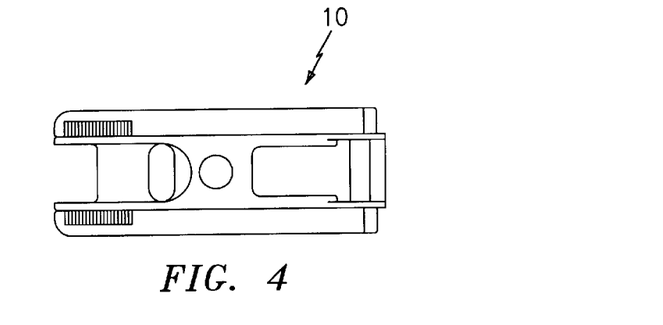
FIG. 4 shows a top view of the intermediate plate laterally movably guided on the coupling plate of the hinge arm.
Figure 5:
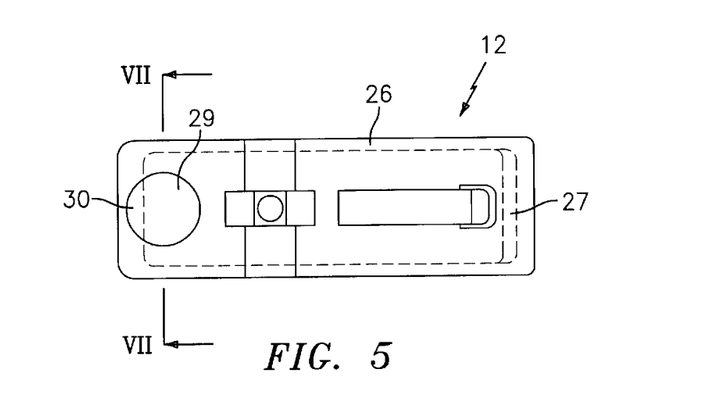
FIG. 5 shows a top view of the bottom plate coupling with the pre-mounted base plate.

From FIGS. 1 to 3, a fitting consisting of a hinge arm having intermediate plates supporting these can be seen which can be connected to a base plate 1 which is pre-mounted to a side panel 3 of a piece of furniture by screws 2.

The hinge arm 4, which is U-shaped in cross-section, is connected in the usual manner by two links 5 to a swivel-lable hinge cup 6 which is fastened in the usual manner in a flat blind borehole of a door or flap 7.

The hinge arm 4 is swivellably pivoted on a first intermediate plate 8 and swivellable relative to this by actuation of the adjusting screw 9 for lateral adjustment.

The first intermediate plate 8 also U-shaped in cross-section is guided in a longitudinally movable manner on the second intermediate plate 10 for the depth adjustment and can be fixed in place relative to this by the fastening screw 11 penetrating an oblong hole. The second intermediate plate 10 is guided laterally movably on the bottom intermediate plate 12 serving the coupling for the vertical adjustment, with the vertical adjustment being effected by actuation of an eccentric disc 13. The type of this vertical adjustment by means of an eccentric cam is known from DE-GM 94 09 459.5 to which reference is made for a more detailed description. In this known fastening device, the base plate corresponding to the bottom coupling intermediate plate 12 is screwed directly to a support panel, while the intermediate plate corresponding to the laterally movable second intermediate plate 10 is designed as a laterally movable top plate.

The three-dimensional adjustability of a hinge arm by intermediate plates is known per se and is therefore not described in any detail here.

The present invention relates to the special type of the fastening of the bottom coupling intermediate plate 12 to the pre-mounted base plate 1 which is described in more detail below.

The base plate 1 consists of an essentially rectangular shell blank of steel sheet metal. The left end section 15 is raised over the centre part 16 by means of a bending at angles so that a gap is formed between the plane of the bottom side of the centre part 16 and the bottom side of the end section 15. The end section 15 is provided with a borehole 17 which is penetrated by a shaft 18 which supports a disc-shaped eccentric head on its top side and a rivet head 20 on its bottom side by means of which the shaft 18 is retained rotatably but unmovably in an axial direction in the borehole 17. The eccentric disc-shaped head 19 is provided in the manner visible from FIG. 3 with intersecting slots 21 so that it can be turned using a Philips screwdriver.

The base plate 1 is furthermore provided with two fastening boreholes 22 through which fastening screws 2 grip for pre-mounting on a support part 3. On its right end 23 tapered in its width, the base plate 1 is provided with a chamfer so that a hook-shaped edge 24 which can be gripped behind is formed.

The bottom coupling plate 12 which supports the hinge arm by means of the first intermediate plate 8 and the second intermediate plate 10 can be connected to the base plate 1. The bottom intermediate plate 12 is designed as a rectangular top plate gripping over the base plate 1 and provided on its bottom side with a circumferential rim 26. On its right end, the straight-running rim section 27 is designed in a hook shape with a section complementary to the hook-shaped protrusion 24 so that the hook-shaped protrusion 24 and the hook-shaped section 27 can engage in a hooking manner with each other in the manner visible from FIG. 2.

At its left end region opposite the hook-shaped section 27, the intermediate plate 12 is provided with a breakthrough 29 which is larger than the diameter of the eccentric head 19 so that the intermediate plate 12 can be set onto the base plate 1 in such a manner that the eccentric head 19 lies in the protrusion 29. At its left end region, the breakthrough 29 is provided with a step-shaped shoulder 30.

If the coupling intermediate plate 12 is set onto the base plate 1 from above in the manner visible from FIG. 1, the parts 24, 27 hooking up to each other are in front of each other and the eccentric, disc-shaped head 19, which covers the base plate 1 completely in its mounting starting position visible from FIG. 1, engages the breakthrough 29 of the intermediate plate 12. In this assembled position, the eccentric head 19 is turned using a Philips screwdriver from its position visible in FIG. 1 to the position visible in FIGS. 2 and 3 in which the head 19 grips over the step-shaped shoulder 30 which rises in a wedge shape and abuts the edge 32 of the step-shaped shoulder with its rim so that the intermediate plate 12 is moved to the left relative to the base plate 1 and the parts 24, 27 complementary to each other and hooking up to each other engage each other.

In the embodiment in accordance with FIGS. 8 to 14, the design of the intermediate plates supporting the hinge 4 which allows the three-dimensional adjustment is identical to the aspect in accordance with FIGS. 1 to 3 with the exception of the bottom coupling intermediate plate 40. The bottom coupling intermediate plate 40 is connected to the second intermediate plate 41 by an eccentric cam riveted thereto as has been described in DE-GM 94 09 459.4.

The intermediate plate 40 is in turn formed essentially rectangularly and possesses on its bottom side a circumferential rim 42 with which it partially grips over the base plate 43. The base plate 43 possesses in its left end region a section 45 raised over its main part 44 which section 45 is provided with a borehole 46 in which a disc-shaped eccentric head 47 is held in the manner described by means of FIG. 1 to 3 rotatably, but unmovably in an axial direction. The base plate 43 is in turn provided with two boreholes 48 with which these can be fastened to a side panel of a piece of furniture by means of fastening screws 49.

The base plate 43 is provided in its right end region with a protruding hook-shaped part 50 tapered in its width. In its left end region the base plate 43 is provided with a break-through 51 which is provided on its left side with an edge 52 which can be gripped behind.

Figure 9:
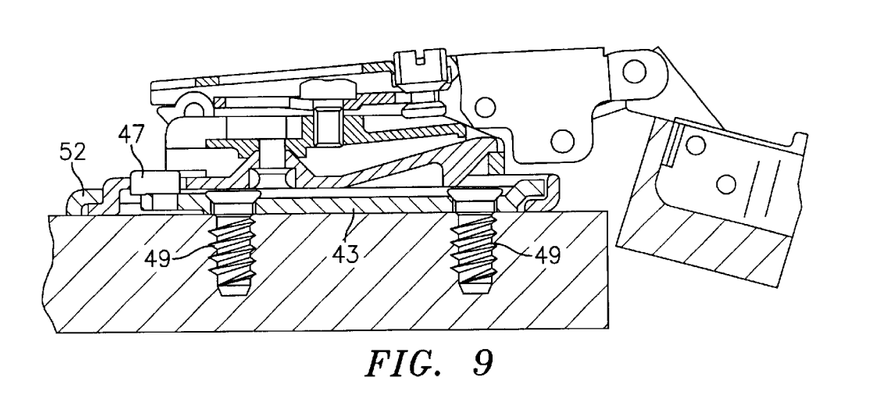
Figure 10:
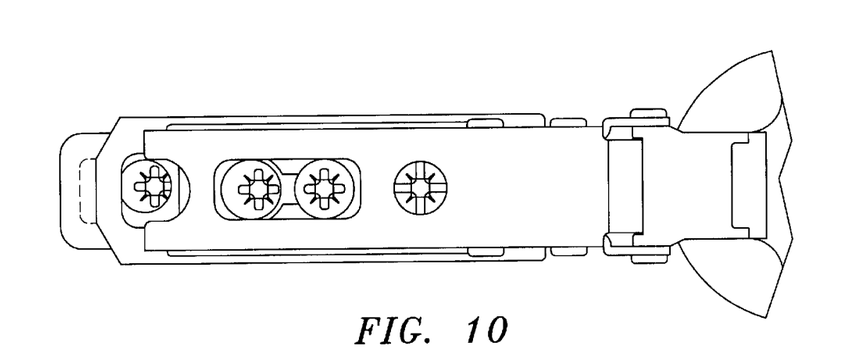
Figure 11:
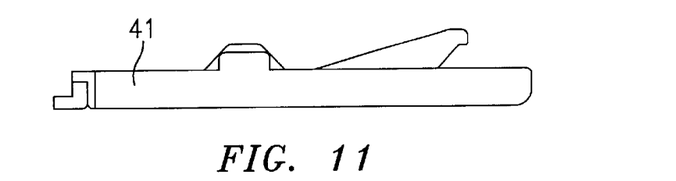
FIG. 11 shows a side view of the bottom intermediate plate of the hinge arm to be mounted.
Figure 12:
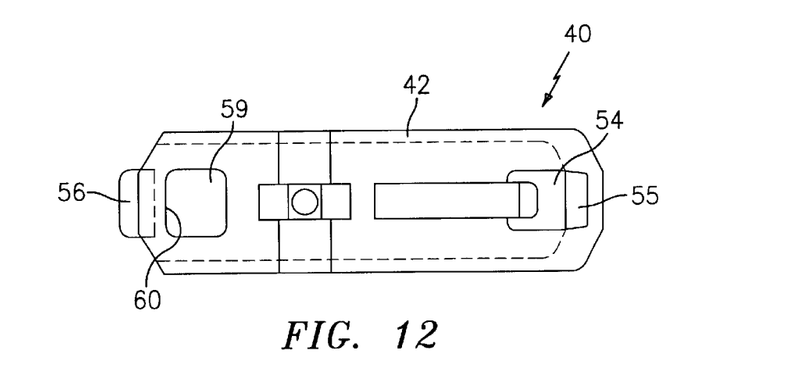
FIG. 12 shows a top view of the plate of FIG. 11.
Figure 13:
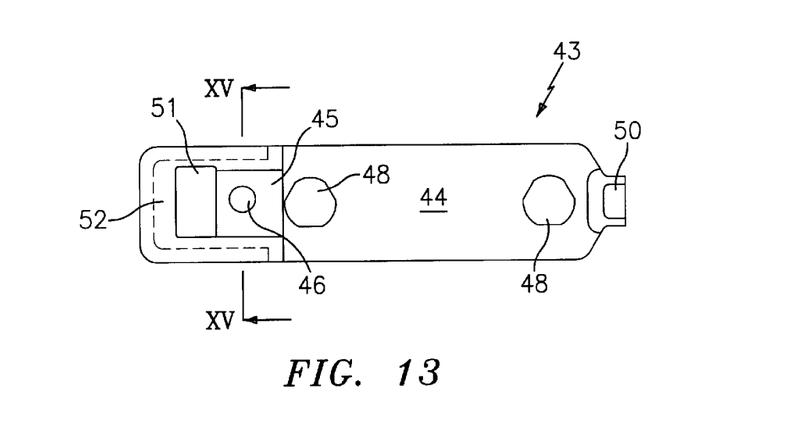
FIG. 13 shows a top view of the base plate to be pre-mounted.
Figure 14:
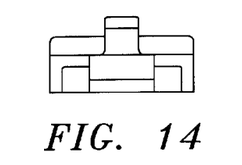
FIG. 14 shows a front view of the plate of FIG. 13.
Figure 15:
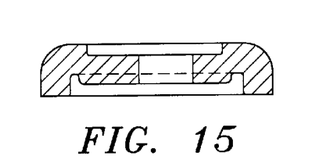
FIG. 15 shows a section along the line XV—XV through the base plate of FIG. 13.
Figure 16:
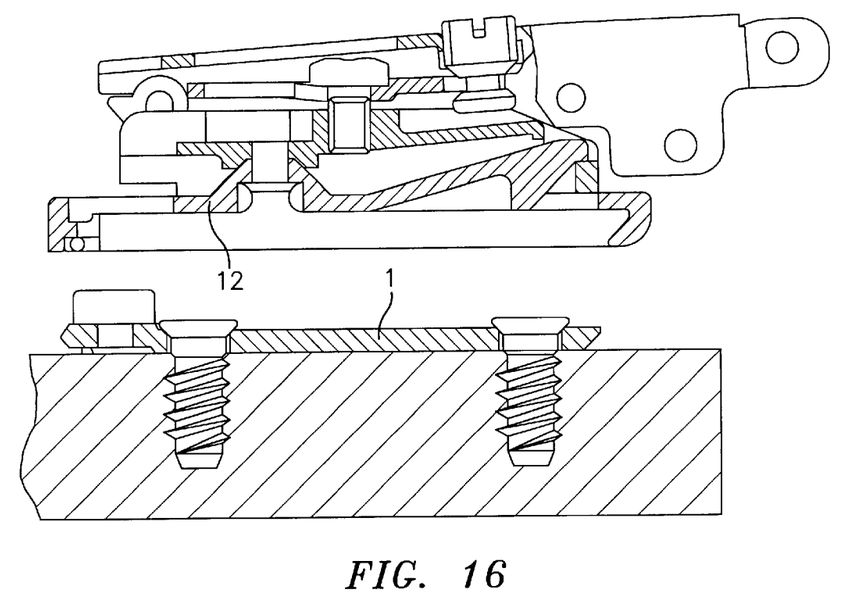
FIG. 16 shows a representation of the device of FIG. 1 in which the base plate and the intermediate plate are provided for purposes of pre-assembly with a locking device consisting of a spring wire.

The bottom coupling intermediate plate 40 is provided on its right end region with a breakthrough 54 whose outer edge is formed by a bridge 55 which is gripped over by the hook-shaped part 50 in the state visible from FIG. 9. At its left end, the intermediate plate 40 is provided with a hook-shaped bend 56 directed downwards which grips under the rear edge 52 of the breakthrough 51 of the base plate 43 in the coupled state visible from FIG. 9.

The bottom intermediate plate 40 is furthermore provided in its left end region with an essentially rectangular break-through 59 which serves the acceptance of the eccentric head 47.

Figure 8:
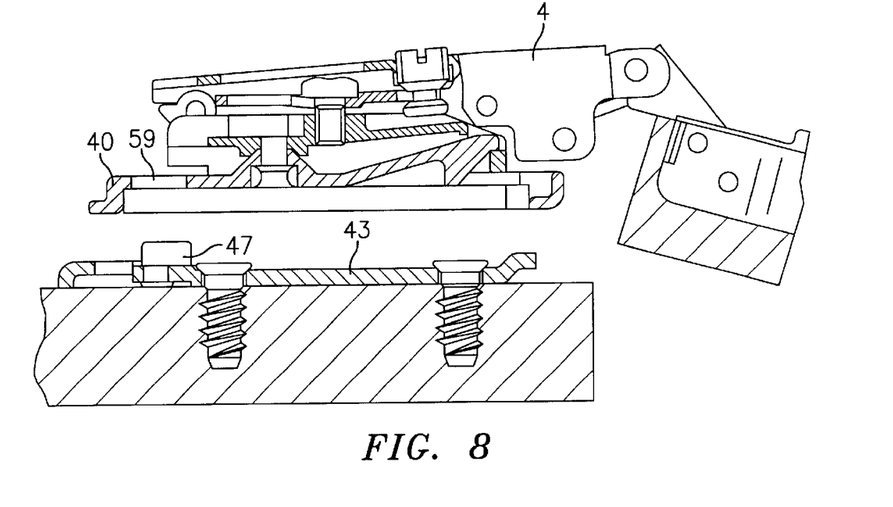
FIGS. 8 to 10 show another embodiment corresponding to FIGS. 1 to 3 of a connection between a coupling intermediate plate and a pre-mounted base plate.

To connect the coupling intermediate plate 40 to the base plate 43, the intermediate plate 40 is set onto the base plate 43 in the manner visible from FIG. 8 in a state in which the eccentric head fully covers the raised section 40. As soon as the intermediate plate 40 is set onto the base plate 43, the eccentric head 47 is turned using a Philips screwdriver in such a way that its rim engages the rear edge 60 of the breakthrough 59 and pushes the intermediate plate 40 to the left so that the parts 50, 55 and 52, 56 to be hooked together come into hooking engagement with one another.

Figure 17:
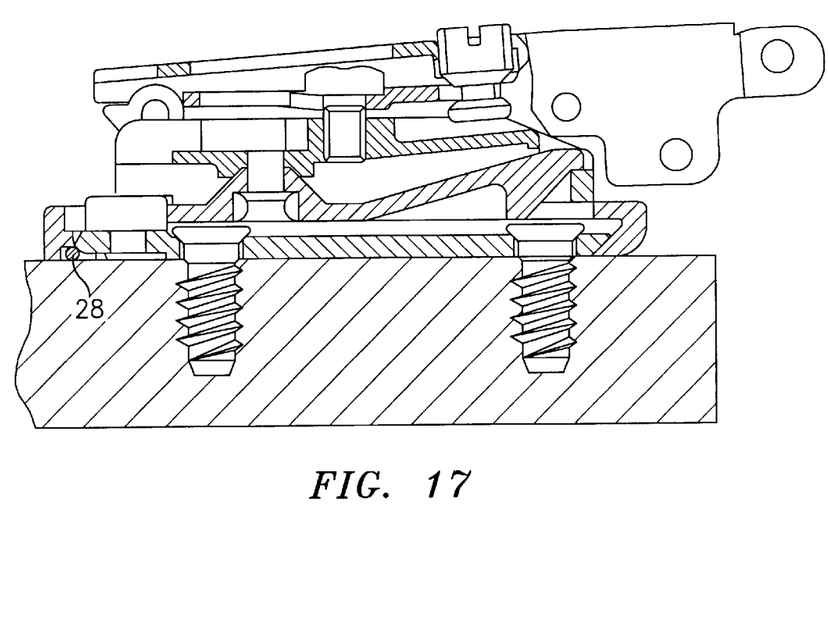
FIG. 17 shows the apparatus of FIG. 16 in which the base plate and the intermediate plate are locked together for purposes of pre-mounting.
Figure 18:
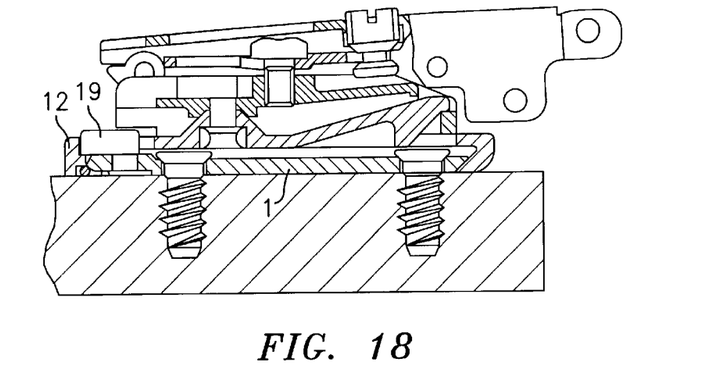
FIG. 18 shows a representation of the device of FIG. 2 in which the base plate and the intermediate plate are interlocked with each other by closing the eccentric cam after their locked pre-mounting.
Figure 19:
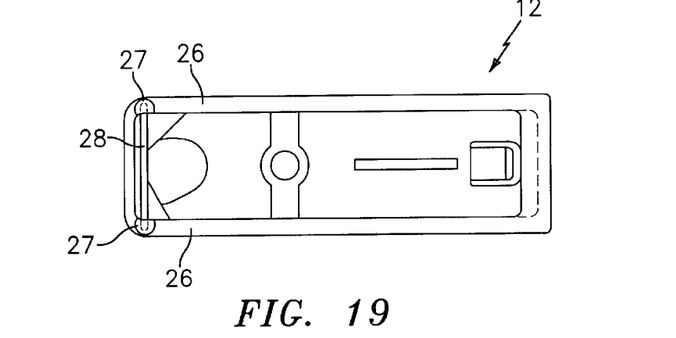
FIG. 19 shows a bottom view of the intermediate plate of FIG. 16.
Figure 20:
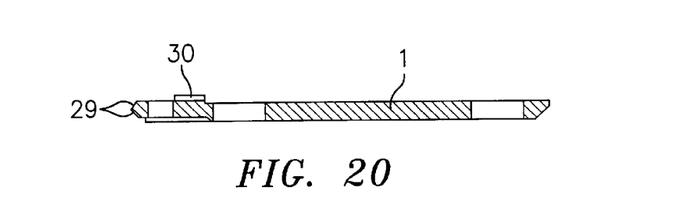
FIG. 20 shows a longitudinal section through the base plate of FIGS. 16 to 18.
Figure 21:
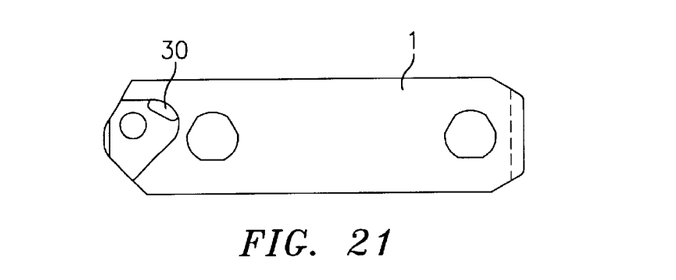
FIG. 21 shows a top view of the base plate of FIG. 20.

By means of FIGS. 16 to 21, an apparatus of the type described in FIGS. 1 to 15 is described in more detail in which the base plate 1 and the intermediate plate 12 can be locked together for purposes of pre-mounting. The intermediate plate 12 possesses in the end region of the rim 26 circumferential on its bottom side pockets or recesses 27 opposite one another in which the ends of a resilient wire piece 28 are retained. The base plate 1 is provided on its rear end, i.e. the one opposite the joint side, with a roof-shaped chamfer 29. This roof-shaped chamfer 29 and the disposition of the spring wire 28 have been selected so that the locking of the base plate 1 to the intermediate plate 12 visible from FIG. 17 is produced when both are brought into engagement with their hooking parts 24, 27 and subsequently the intermediate plate 12 is pressed down with its rear end so that the spring wire 28 slides over the upper inclined surface 29 of the base plate 1 and engages in a locking manner on the bottom inclined surface 29. This pre-fixed position effected only be locking can be seen in FIG. 17. After any required adjustment, the final interlocking visible from FIG. 18 can then be effected by the described turning of the eccentric disc.

The base plate 1 is additionally provided on its top side with a burl-like protrusion 30 which forms a stop for the eccentric head 19 in the open, that is not interlocking position.

Figure 22:
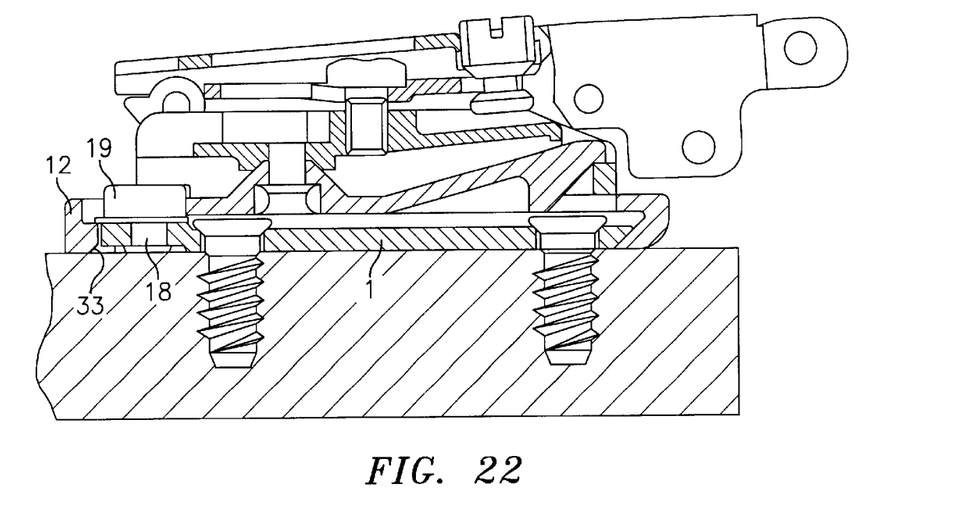
FIG. 22 shows a representation corresponding to FIG. 2, in which the intermediate plate and the base plate are locked together in their pre-mounted state by a resilient disc prior to the closing of the interlock.
Figure 23:
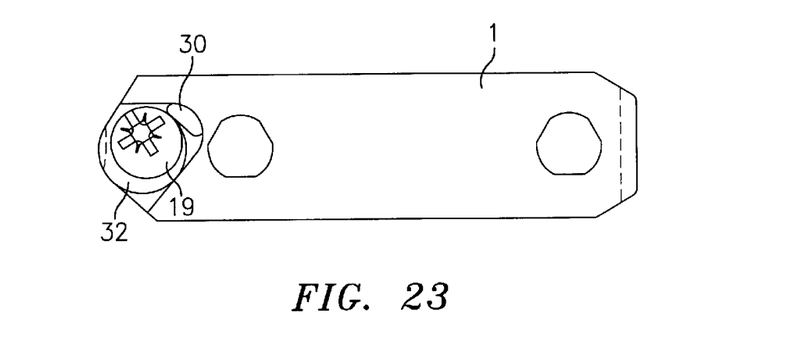
FIG. 23 shows a top view of the base plate of FIG. 22.

In the embodiment of FIGS. 22 and 23, there is retained on the shaft 18 between the eccentric head 19 and the top side of the base plate 1 a resilient disc 32 which slightly protrudes over the rear end of the base plate in the manner visible from FIGS. 22 and 23. The rim of the intermediate plate 12 is provided in its rear end region with a chamfer 33. If now the base plate 1 and the intermediate plate 12 are hooked together at their front end regions in the described manner and if then the intermediate plate 12 is pressed down with its rear end region, the rear rim of the intermediate plate provided with the chamfer 33 travels over the protruding part of the resilient plate 32 until this lies in the manner visible from FIG. 22 on the step which is formed between the breakthrough 29 and the rear rim of the intermediate plate 12.

Figure 26:
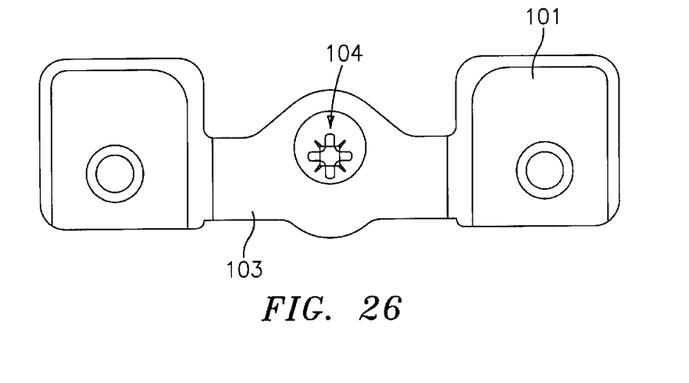
FIG. 26 shows a top view of the ground plate having an interlocking eccentric cam fastened thereto.
Figure 27:
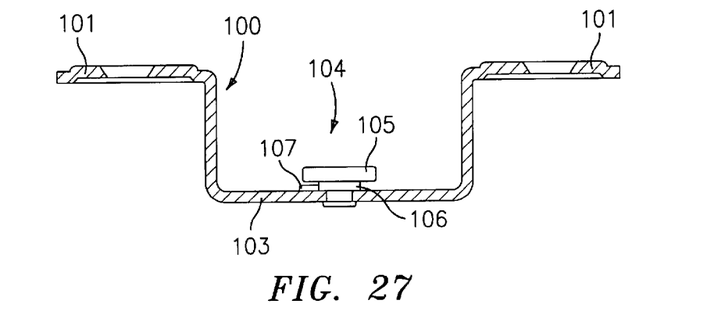
FIG. 27 shows a section through the ground plate.
Figure 28:
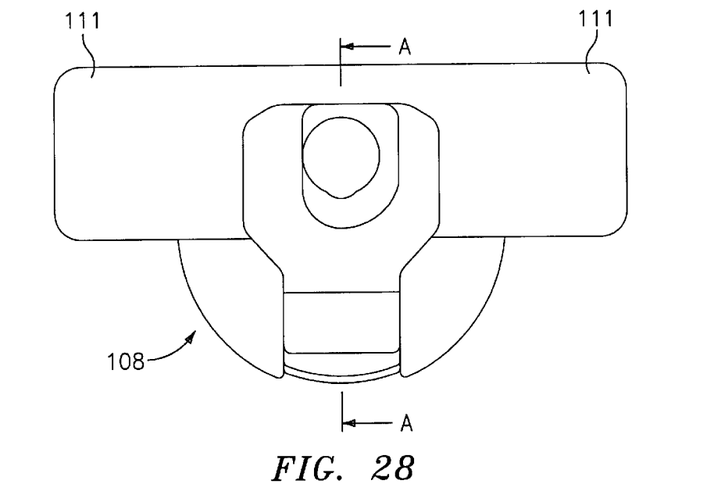
FIG. 28 shows a top view of the hinge cup similar to FIG. 25, with the hinge cup being shown in the non-mounted state, i.e. without any ground plate.
Figure 29:
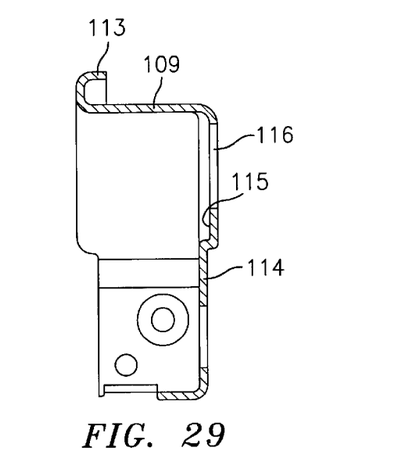
FIG. 29 shows a section through the hinge cup along the line A—A in FIG. 28.

The apparatus for the fastening of a hinge cup shown in FIGS. 24 to 29 possesses an essentially U-shaped bottom plate 100 which can be made from sheet metal as a bending stamped part (see FIGS. 26 and 27). The bottom plate 100 possesses ends which overhang laterally and lie in a common plane and which each form a fastening flange 101. A passage is formed in each fastening flange 101 in order to fasten the bottom plate 100 with screws or the like.

The bottom plate 100 is inserted into and screwed fast to a milled borehole 102 in a door or the like which is intended to accept the hinge cup. Preferably, for this purpose, the bottom plate 100 is provided with dowels (not shown) and mounted by machine. The U-shaped design of the bottom plate 100 is adapted to the walls or the design of the recess for the hinge cup.

Figure 24:
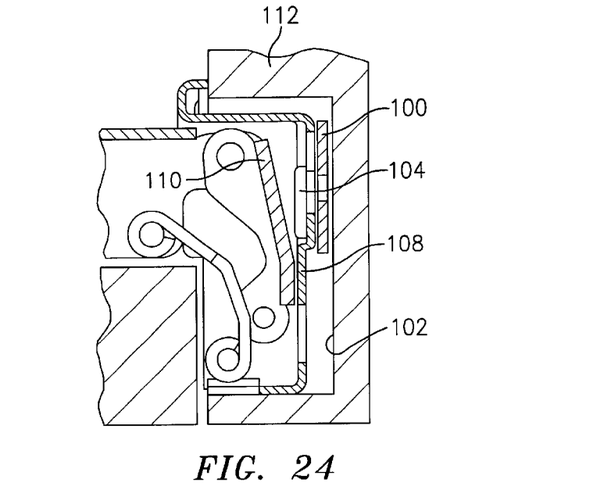
FIG. 24 shows a section through the part of a hinge having a hinge cup, which is inserted and fastened in a recess in a door in accordance with a preferred embodiment of the invention.
Figure 25:
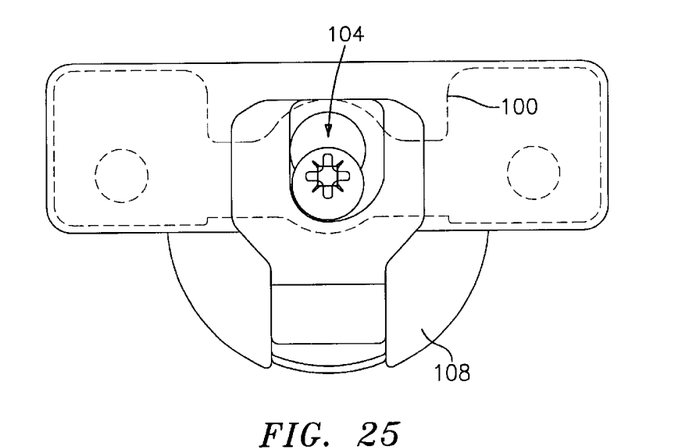
FIG. 25 shows a top view of the hinge cup of the hinge of FIG. 24, where a ground plate under the hinge cup is shown in broken lines.

On the bottom section 103 of the bottom plate 100 there is fastened an interlocking eccentric cam 104 which forms an interlocking device for the hinge cup. The interlocking eccentric cam 104 is rotatably connected, in particular riveted, to the bottom plate 100 around an axis perpendicular to the bottom of the recess 102. As FIGS. 24 and 27 show, the interlocking eccentric cam 104 possesses a disc-shaped eccentric head 15 which is seated on an equally eccentric collar 106. The bottom plate 100 is provided in the region of the borehole, in which the interlocking eccentric cam 104 is rotatably seated, with a protruding embossing 107 which forms a stop for the collar 106 of the interlocking eccentric cam 104 which limits the rotation of the eccentric cam and determines its mounting position (see FIG. 27).

Figure 6:
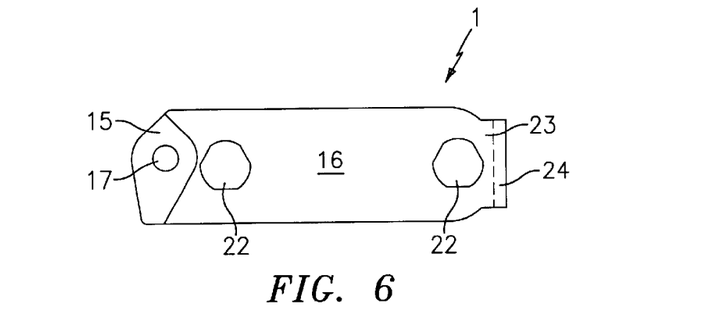
FIG. 6 shows a top view of the base plate to be pre-mounted to a support part.
Figure 7:
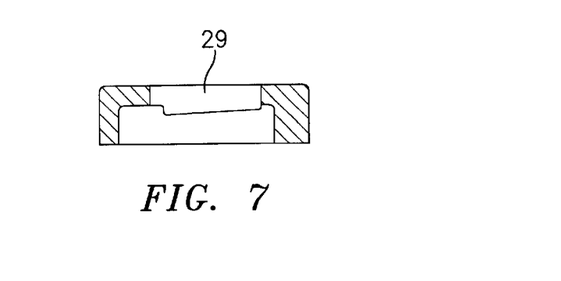
FIG. 7 shows a section along the line VII—VII through the coupling plate of FIG. 5.

The hinge cup 108 possesses a bowl-shaped cup section 109 having an essentially cylindrical cross-section (see FIGS. 28 and 29) which accepts in its interior area in the state of the hinge folded together its link 100 jointed therein (see FIG. 24). On the upper rim of the cup section 109 flanges 111 projecting laterally are provided which protrude over the recess 102 in the door and lie on its inside so that the hinge cup is supported there. The flanges 111 are dimensioned and disposed in such a way that they fully cover the fastening flange 101 of the bottom plate 100. They possess circumferentially on their rim a bridge 113 projecting to the door 112 (see FIG. 6), which bridge 113 encompasses the fastening flanges of the bottom plate 100 true to size and filly covers them.

The hinge cup 108 possesses on its bottom 114 a sink-like hollow 115 having a passage 116 which is penetrated by the eccentric head 105 in the mounted state of the hinge. This hollow 115 of the hinge cup 108 accepts the eccentric head 105 to such an extent that it does not impede the outer link 110 of the hinge in its closed state (see FIG. 24).

The hollow 115 and accordingly the interlocking eccentric cam 104 and the total assembly of the bottom plate 100 are radially offset from the centre of the hinge cup and also away from the articulation points of the links 110 so that on the one hand, the interlocking eccentric cam 104 does not impede the links 110 and, on the other hand, is more easily accessible in the opened state of the hinge. Furthermore, the torque created during the opening and closing of the door is better accepted on the hinge cup.

The mounting of the hinge is effected as follows:

First, the bottom plate 100 is inserted in the door recess 102 and mounted there by machine by means of corresponding screws on the fastening flange 101.

The hinge cup 108 is set into the door recess 102 and onto the bottom plate 100 in the opened position of the hinge. For this purpose, the interlocking eccentric cam 104 is previously turned against the stop 107 so that the interlocking eccentric cam 104 is in its assembly position. During insertion of the hinge cup 108, the eccentric head 105 is guided through the passage 116 in the cup bottom 114 until the eccentric head 105 projects on the inside of the hinge cup 108 over its bottom 114.

In this inserted state of the hinge cup 108, this is interlocked on the base plate 100 by rotating the interlocking eccentric cam 104. Here, the eccentric head 105 grips over the cup bottom 114 of the hinge cup 108 in the manner visible from FIGS. 1 and 2. In the region of the flanges 111 of the hinge cup, no interlocking is necessary so that the flange 111 can be designed in a smooth manner.

Appropriately, the height of the collar 106 of the interlocking eccentric cam 104 corresponds to the thickness of the bottom 114 of the hinge cup 108. The bottom side of the eccentric head 105 can be slightly inclined, i.e. it preferably possesses a wedge-shaped inclined surface to exert a low holding force. The hinge cup 108 is therefore tightened towards the bottom plate 100. In this way, a fast interlocking of the hinge cup 108 without play can be achieved.

What is claimed is:

1. An apparatus to fasten a fitting (4) to a panel (3) of a piece of furniture comprising a base plate (1) fastenable to the panel (3), to which base plate (1) the fitting (4) or a part (12) connected thereto can be connected, wherein the base plate (1) and the fitting (4, 12) are provided on one end with at least one protrusions and bends (27) which can be hooked together and provided on their opposite end regions with a device interlocking the two in the absence of spring means.

2. An apparatus in accordance with claim 1, wherein the base plate (1) and the fitting (4) or the part (12) connected thereto can be brought into their coupled position gripping behind each other by means of parallel movement and wherein the base plate (1) is provided on its opposite end region with a rotatable, but axially unmovable, eccentric disc-shaped head (19) which can be rotated out of its position covering the base plate (1) into a position protruding thereover, in which it penetrates the fitting (12) in a breakthrough (29), grips over a shoulder (30) of the rim of the breakthrough (29) and pushes the fitting (4, 12) in such a way that the parts (24, 27) to be hooked together come into their coupled position.

3. An apparatus in accordance with claim 2, wherein the shoulder (30) of the rim of the breakthrough (29) of the fitting part (12) gripped over by the head (19) is provide with a wedge-shaped chamfer.

4. An apparatus in accordance with claim 1, wherein the coupling part of the fitting is a plate (12).

5. An apparatus in accordance with claim 1, wherein the base plate (1) is provided on its front end with an acute-angled edge (24) and the fitting part (12) with a complementary bend (27) gripping behind this.

6. An apparatus in accordance with claim 1, wherein the base plate (43) and the fitting (4, 40) are provided on ends opposite each other with parts (50, 55; 52, 56) which can be hooked together by parallel movement and gripping behind and wherein the base plate (43) is provided rotatably, but axially unmovably, with an eccentric plate-shaped head (47) which penetrates a breakthrough (59) of the fitting (40), engages at an edge of the breakthrough (49) and thus moves the parts to be hooked together into their coupled position.

7. An apparatus in accordance with claim 1, wherein the fitting (4) hooked to the base plate (1) or the intermediate fitting part (12) connected thereto and hooked to the base plate (1) can be loosely fixed to one another for purposes of pre-mounting at their end regions opposite the hook connection by means of a resilient snap connection.

8. An apparatus in accordance with claim 7, wherein the fitting (4) or the intermediate fitting part (12) are provided at their end regions with a resilient element which when it is pressed down to the plane of the base plate (1) snaps behind a rear chamferred locking edge (29) of the base plate (1).

9. An apparatus in accordance with claim 1, wherein the fitting is a support arm (4) of a hinge.

10. The apparatus in accordance with claim 9, wherein the base plate (1) is fastenable to the panel (3) by dowels or screws (2).

11. The apparatus in accordance with claim 1, wherein the base plate (1) is fastenable to the panel (3) by dowels or screws (2).

12. The apparatus in accordance with claim 1, structured and arranged such that, for fastening, the fitting (4) or part (12) connected thereto need only be set onto the base plate (1), with it subsequently only being necessary to make connection to turn an eccentric head while a shaft (18) rotatably mounted upon the base plate (1), to effect interlocking, and by a corresponding turning back of the eccentric disc or head (19), decoupling of the base plate (1) from the fitting (4) or connecting part (12) can be accomplished.

13. An apparatus to fasten a fitting (4) to a panel (3) of a piece of furniture comprising a base plate (1) fastenable to the panel (3), to which base plate (1) the fitting or a part (12) connected thereto can be connected, wherein the base plate (1) and the fitting (4, 12) are provided on one end with at least one protrusions and bends (27) which can be hooked together and provided on their opposite end regions with a device interlocking the two, the fitting (4) hooked to the base plate (1) or the intermediate fitting (12) connected thereto and hooked to the base plate (1) can be loosely fitted to one another for purposes of pre-mounting at their end regions opposite the hook connection by means of a resilient snap connection, the fitting (4) or the intermediate fitting (12) are provided at their end regions with a resilient element which, when it is pressed down to the plane of the base plate (1), snaps behind a rear chamferred locking edge (29) of the base plate (1), and the resilient element is a spring wire (28) retained in lateral rims (26) of the intermediate plate (12).

14. An apparatus to fasten a fitting (4) to a panel (3) of a piece of furniture comprising a base plate (1) fastenable to a panel (3), to which base plate (1) the fitting or a part (12) connected thereto can be connected, wherein the base plate (1) and the fitting (4, 12) are provided on one end with at least one protrusions and bends (27) which can be hooked together and provided on their opposite end regions with a device interlocking the two, the fitting (4) hooked to the base plate (1) or the intermediate fitting (12) connected thereto and hooked to the base plate (1) can be loosely fitted to one another for purposes of pre-mounting at their end regions opposite the hook connection by means of a resilient snap connection, the fitting (4) or the intermediate fitting (12) are provided at their end regions with a resilient element which, when it is pressed down to the plane of the base plate (1), snaps behind a rear chamferred locking edge (29) of the base plate (1), and the resilient element is a spring disc (32) retained on the shaft (18) of the eccentric cam (19) between the eccentric head and the base plate (1).

* * * * *